(12) United States Patent  (10) Patent No.: US 8,718,300 B1
Dixon  (45) Date of Patent: May 6, 2014

(54) MOTORCYCLE MEDIA SYSTEM

(76) Inventor: Willie E. Dixon, Steger, IL (US)

(*) Notice: Subject to any disclaimer, the term of this patent is extended or adjusted under 35 U.S.C. 154(b) by 1142 days.

(21) Appl. No.: 12/691,734

(22) Filed: Jan. 21, 2010

(51) Int. Cl.
H04R 5/02 (2006.01)
H04B 1/00 (2006.01)

(52) U.S. Cl.
USPC .............. 381/302; 381/86; 224/413; 455/345

(58) Field of Classification Search
USPC ................... 381/86, 302, 389; 455/345, 346; 280/835, 833; 307/9.1, 10.1; D12/107, D12/110, 114, 119; 725/75, 76, 77
See application file for complete search history.

(56) References Cited

U.S. PATENT DOCUMENTS

| | | | | |
|---|---|---|---|---|
| 3,362,596 A * | 1/1968 | Bostwick | | 224/417 |
| 4,436,350 A * | 3/1984 | Jolin | | 312/7.1 |
| 4,445,228 A | 4/1984 | Bruni | | |
| 5,001,779 A | 3/1991 | Eggert et al. | | |
| 5,433,286 A * | 7/1995 | Kumamaru et al. | | 180/219 |
| 5,894,810 A * | 4/1999 | Orr | | 114/343 |
| 6,407,663 B1 | 6/2002 | Huggett | | |
| D461,760 S | 8/2002 | Booth | | |
| 6,428,191 B2 * | 8/2002 | Ohura | | 362/473 |
| 6,494,527 B1 * | 12/2002 | Bischoff | | 296/208 |
| 6,502,884 B2 | 1/2003 | Shimazaki et al. | | |
| 6,647,121 B2 * | 11/2003 | Stanberry et al. | | 381/86 |
| 6,752,444 B2 * | 6/2004 | Kitano et al. | | 296/184.1 |
| 6,783,040 B2 * | 8/2004 | Batchelor | | 224/413 |
| 6,793,110 B2 * | 9/2004 | Hamilton | | 224/413 |
| 8,199,961 B2 * | 6/2012 | Omoda et al. | | 381/389 |
| 8,270,640 B1 * | 9/2012 | Barnes | | 381/302 |
| 2002/0131606 A1 | 9/2002 | Stanberry et al. | | |
| 2005/0000747 A1 | 1/2005 | Richlen et al. | | |
| 2005/0265566 A1 * | 12/2005 | Suzuki et al. | | 381/302 |
| 2007/0291957 A1 * | 12/2007 | Khan | | 381/86 |
| 2008/0212793 A1 * | 9/2008 | Kai et al. | | 381/86 |

* cited by examiner

Primary Examiner — Xu Mei

(57) ABSTRACT

A motorcycle media system for playing audio or video on a motorcycle includes a wiring harness mounted on a motorcycle, a plurality of speakers is mounted to the motorcycle and an enclosed housing mounted behind a rider of the motorcycle. The housing is removable from the motorcycle to expose a compartment in the motorcycle. A power source is mounted to the motorcycle and in electrical communication with the wiring harness. A media source is mounted to the motorcycle, within the compartment, and in electrical communication with the wiring harness. A display mounted within the compartment and is in electrical communication with the wiring harness. A control assembly is in electrical communication with the wiring harness for controlling the operation of the system. A bracket supports the control assembly on handlebars of the motorcycle.

1 Claim, 11 Drawing Sheets

MOTORCYCLE MEDIA SYSTEM

BACKGROUND OF THE DISCLOSURE

1. Field of the Disclosure

The disclosure relates to media systems and more particularly pertains to a new media system for playing audio or video on a motorcycle.

2. Summary of the Disclosure

An embodiment of the disclosure meets the needs presented above by generally comprising a wiring harness mounted on a motorcycle, a plurality of speakers mounted to the motorcycle and an enclosed housing mounted behind a rider of the motorcycle. The housing is removable from the motorcycle to expose a compartment in the motorcycle. A power source is mounted to the motorcycle and in electrical communication with the wiring harness. A media source is mounted to the motorcycle, within the compartment, and in electrical communication with the wiring harness. A display is mounted within the compartment and is in electrical communication with the wiring harness. A control assembly is in electrical communication with the wiring harness for controlling the operation of the system. A bracket supports the control assembly on handlebars of the motorcycle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
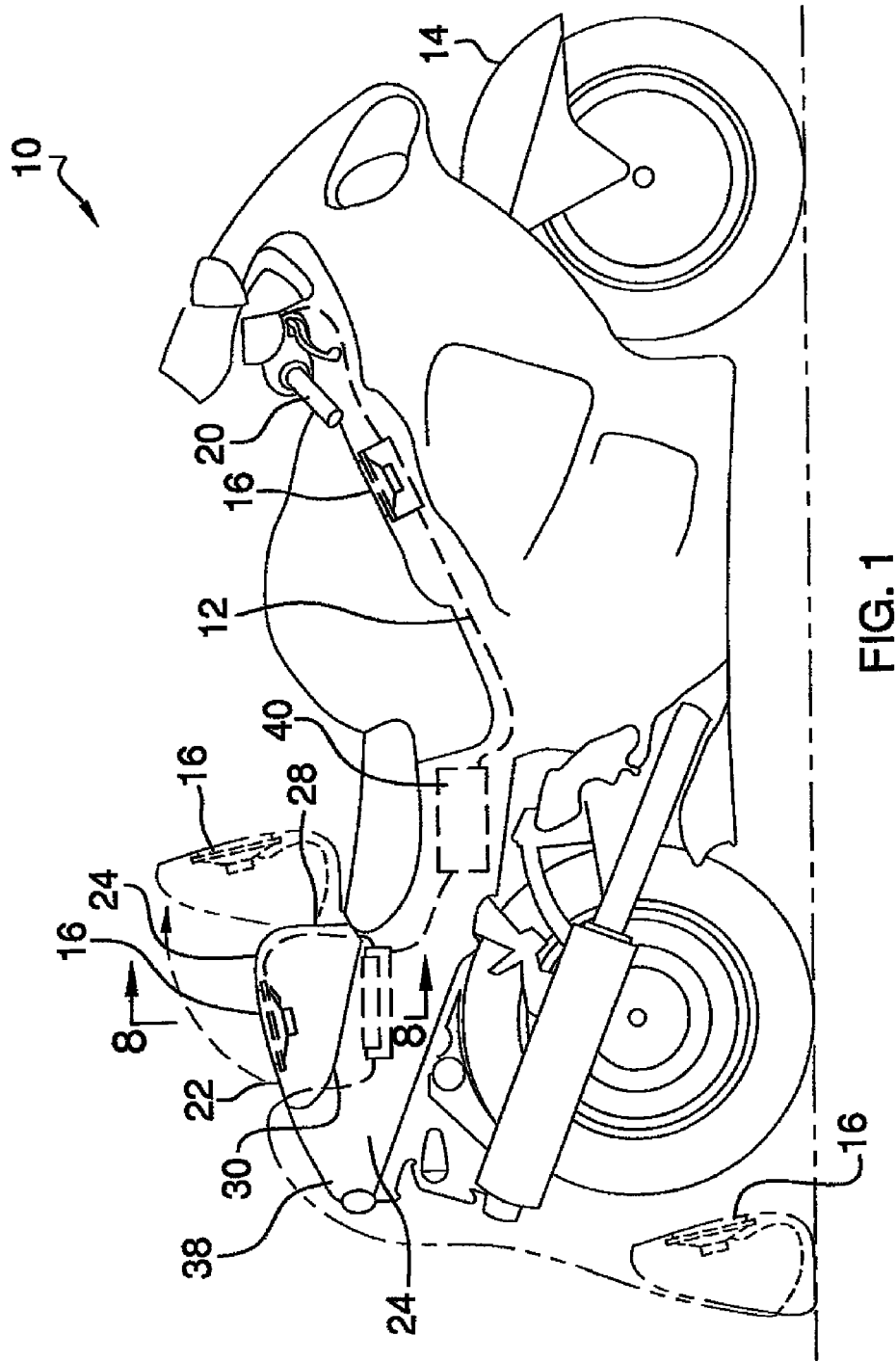
FIG. 1 is a side view of a motorcycle media system according to an embodiment of the disclosure.
Figure 2:
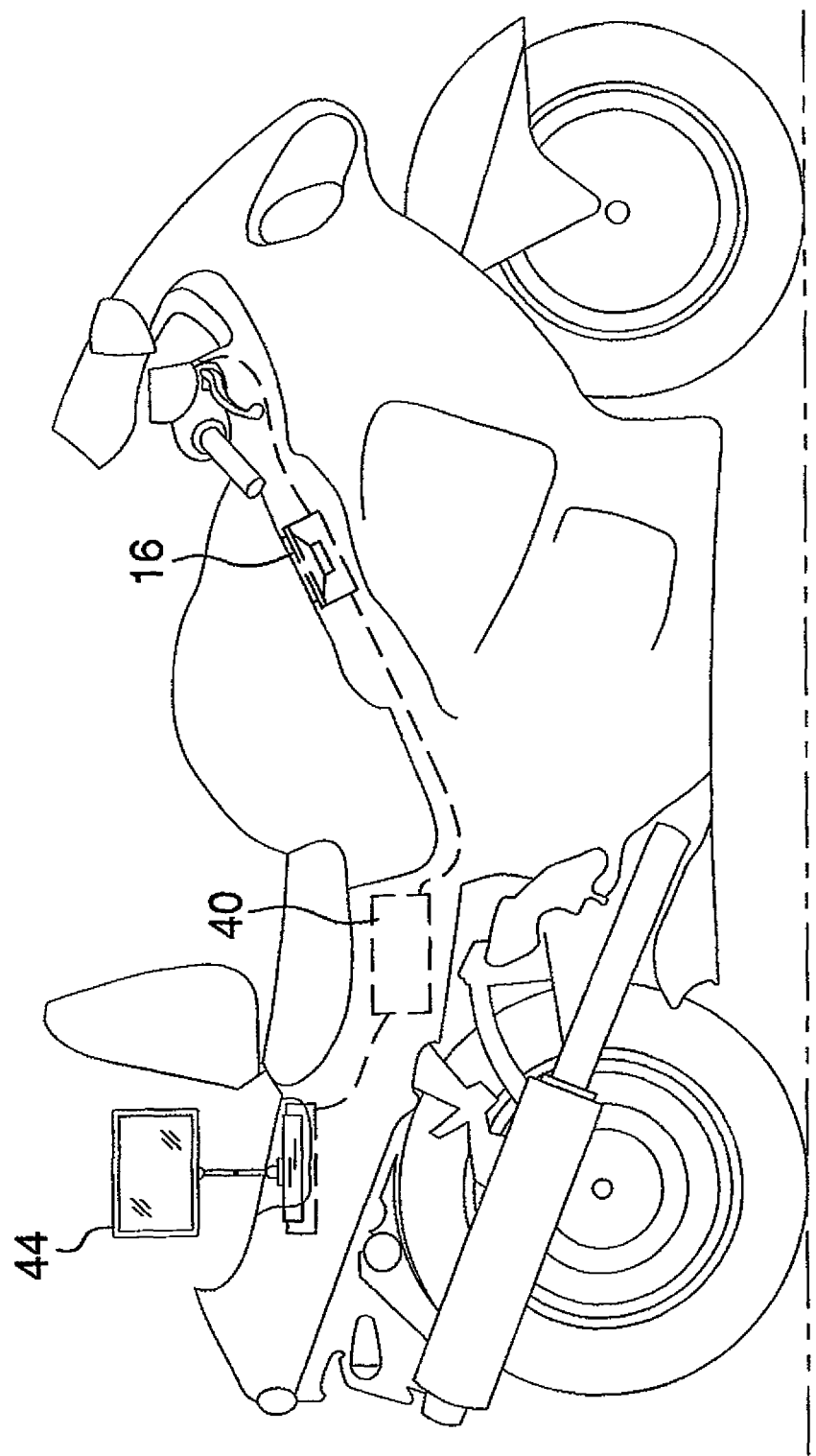
FIG. 2 is a side view of an embodiment of the disclosure.
Figure 3:
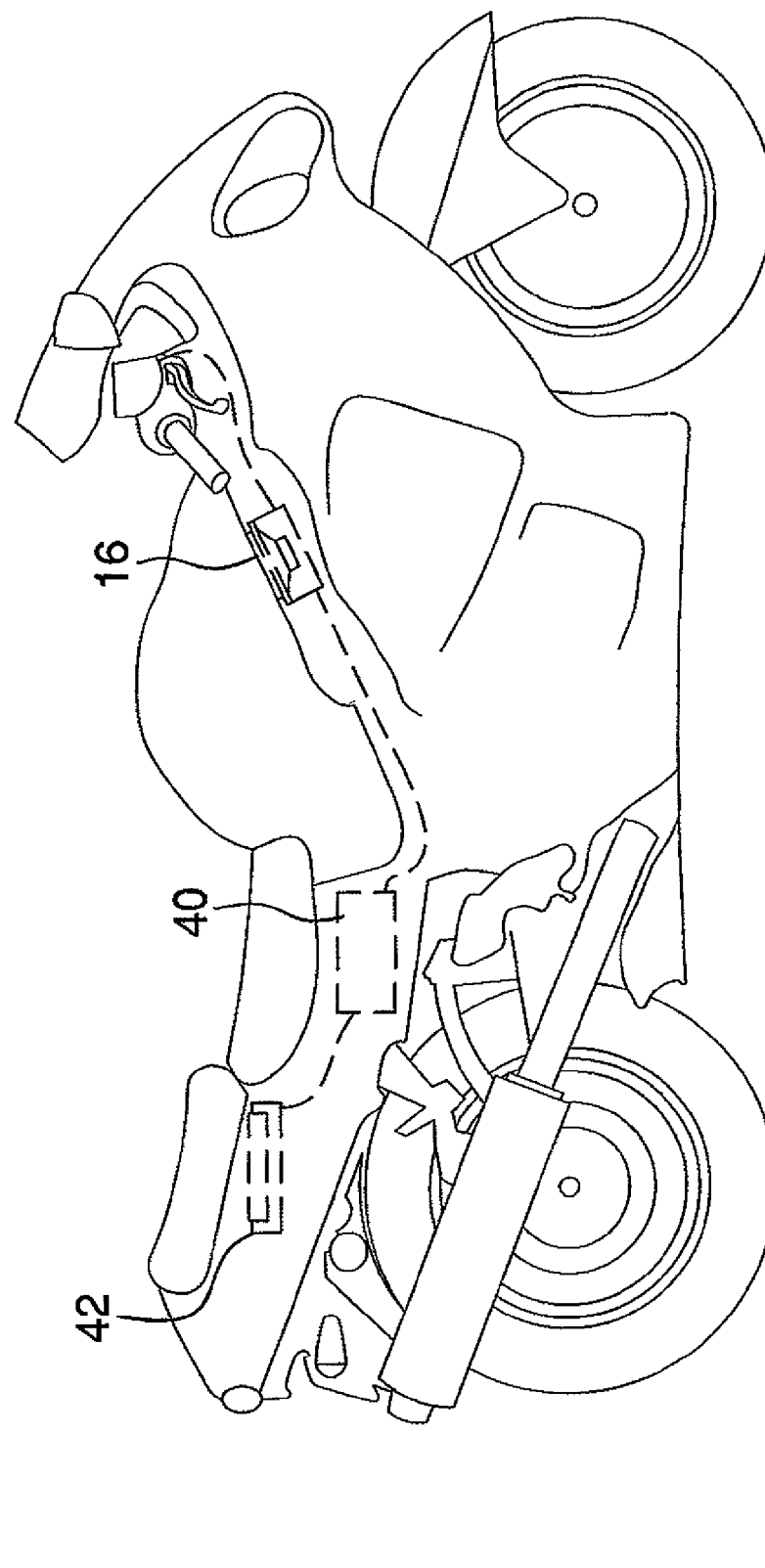
FIG. 3 is a side view of an embodiment of the disclosure.
Figure 4:
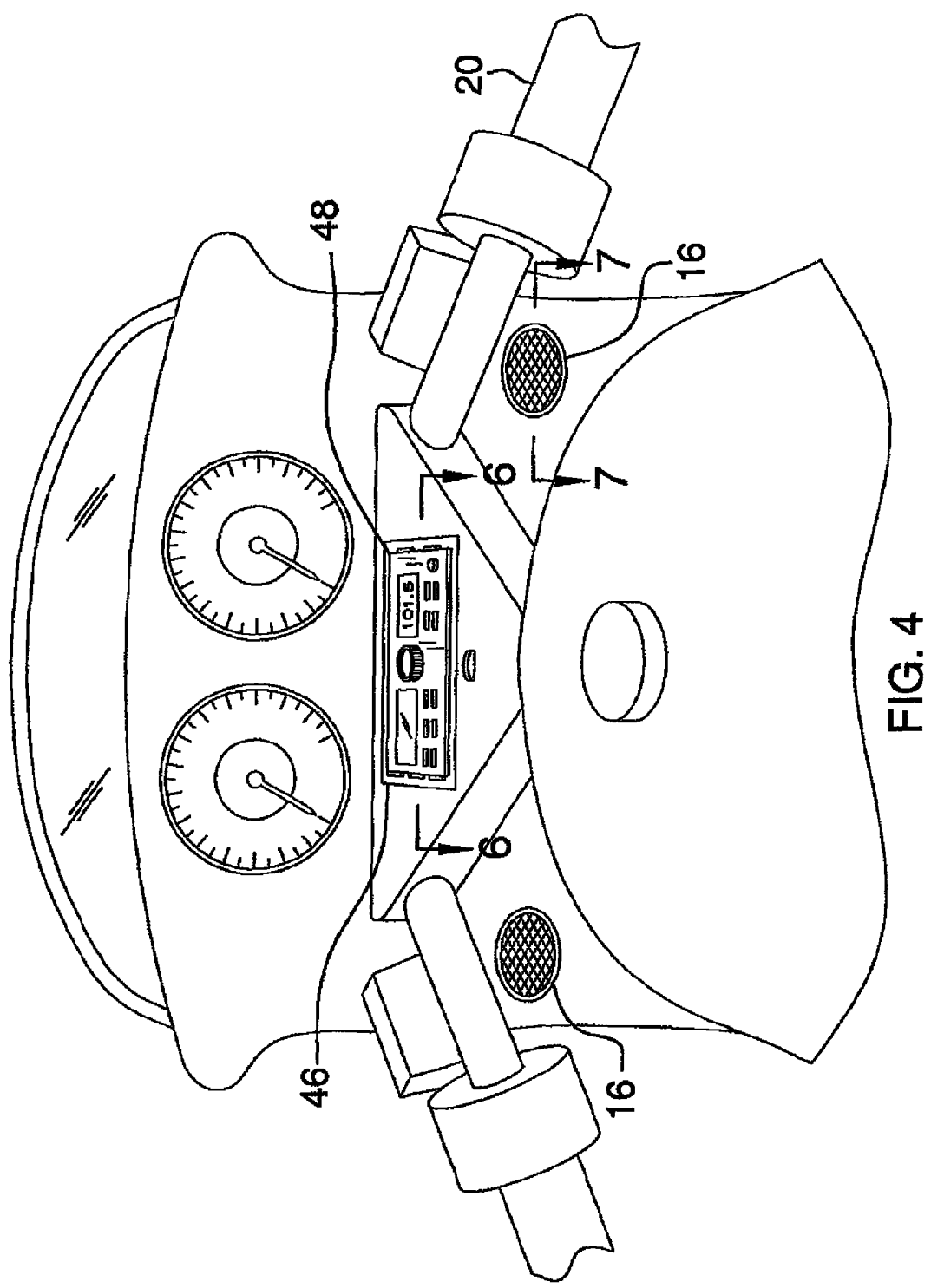
FIG. 4 is a top view of an embodiment of the disclosure.
Figure 5:
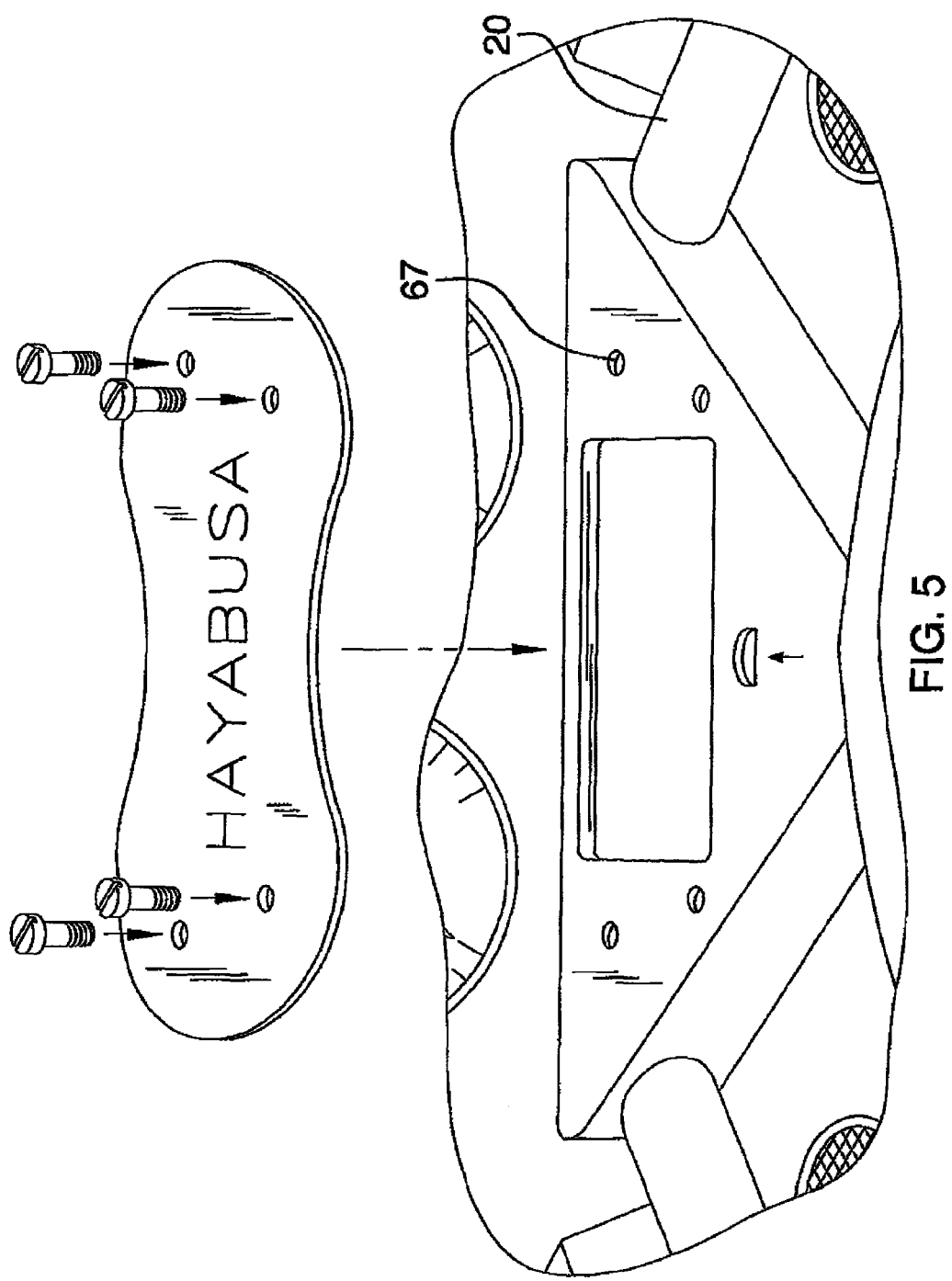
FIG. 5 is a top view of an embodiment of the disclosure.
Figure 6:
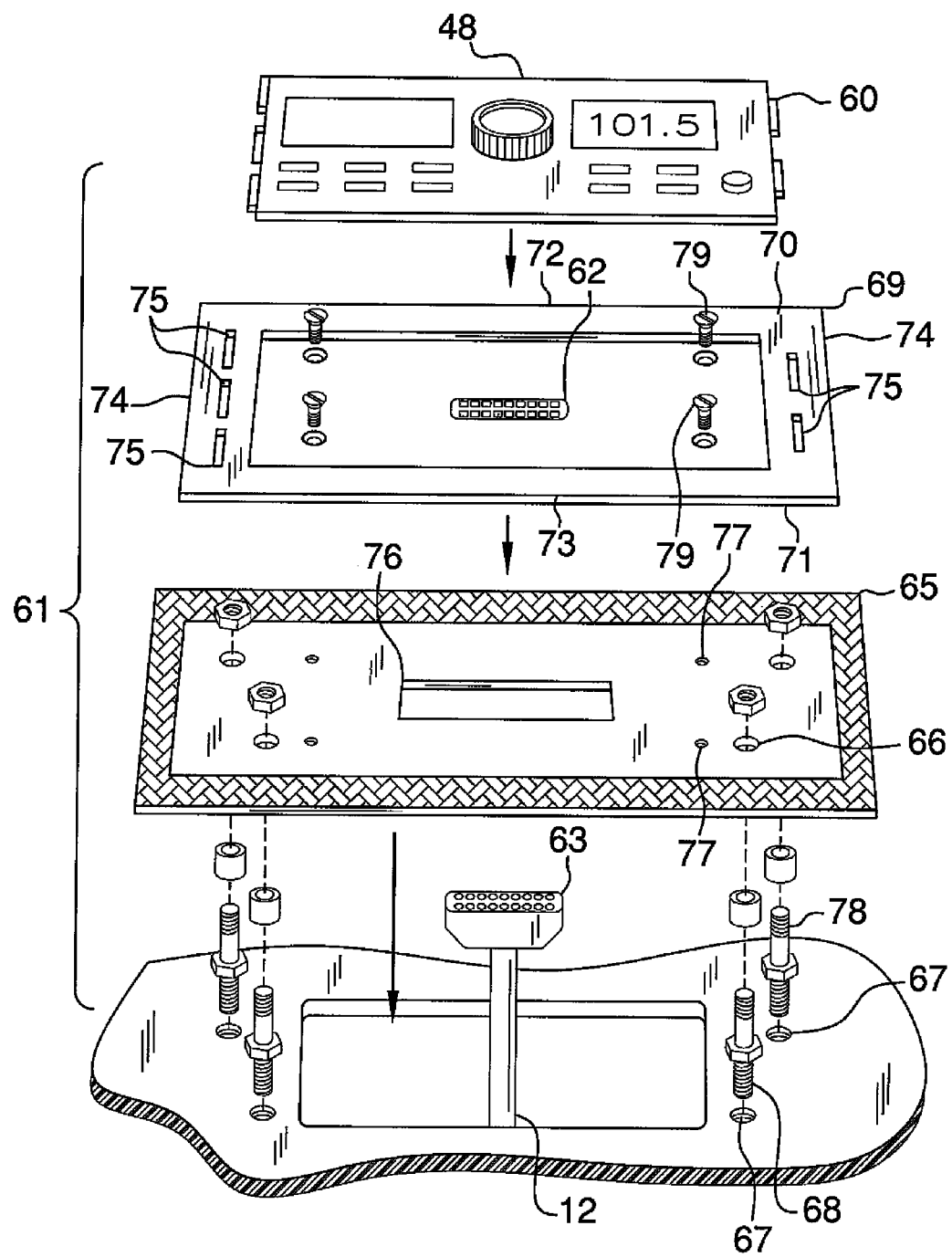
FIG. 6 is an exploded view of the components at 6-6 of an embodiment of the disclosure.
Figure 7:
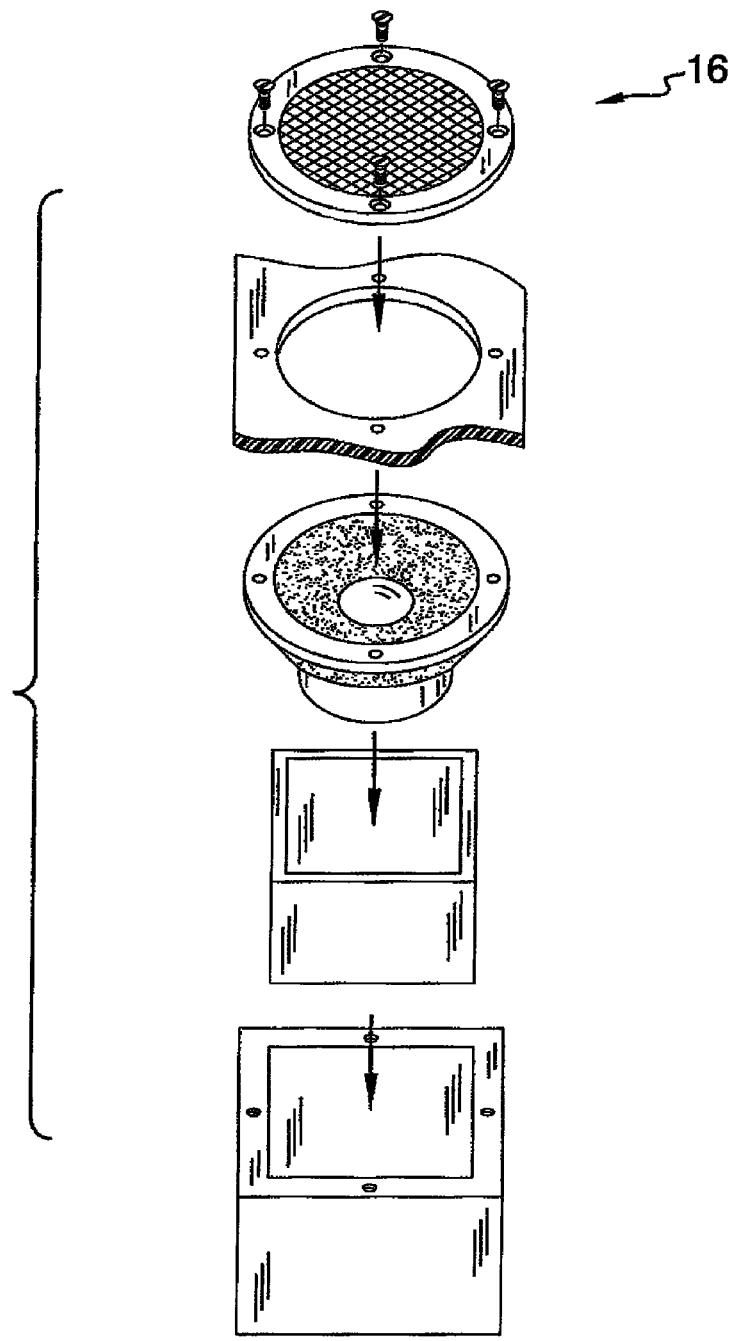
FIG. 7 an exploded view of the components at 7-7 of an embodiment of the disclosure.
Figure 8:
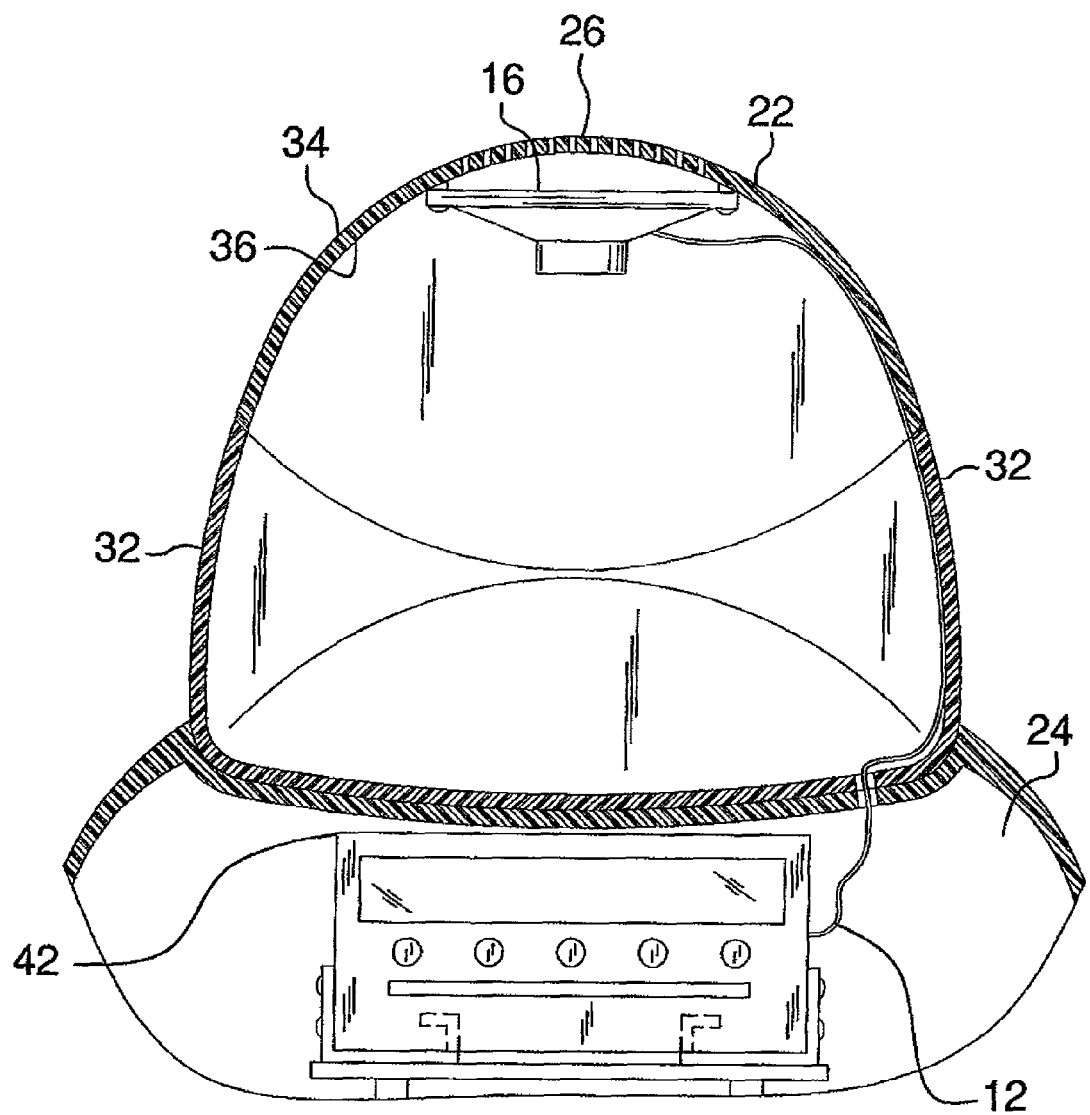
FIG. 8 is a cross-section view along 8-8 of an embodiment of the disclosure.
Figure 9:
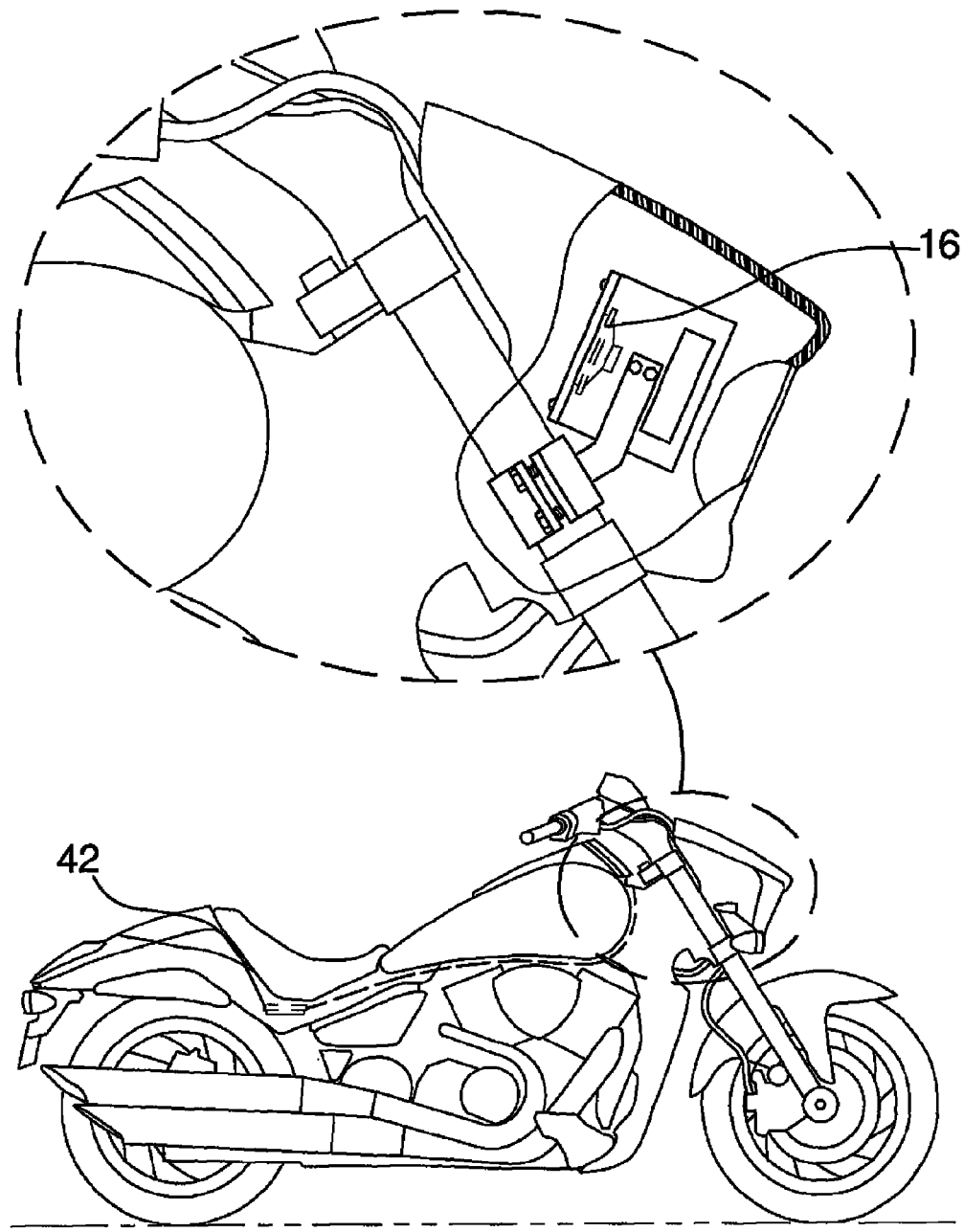
FIG. 9 is a side view of an embodiment of the disclosure.
Figure 10:
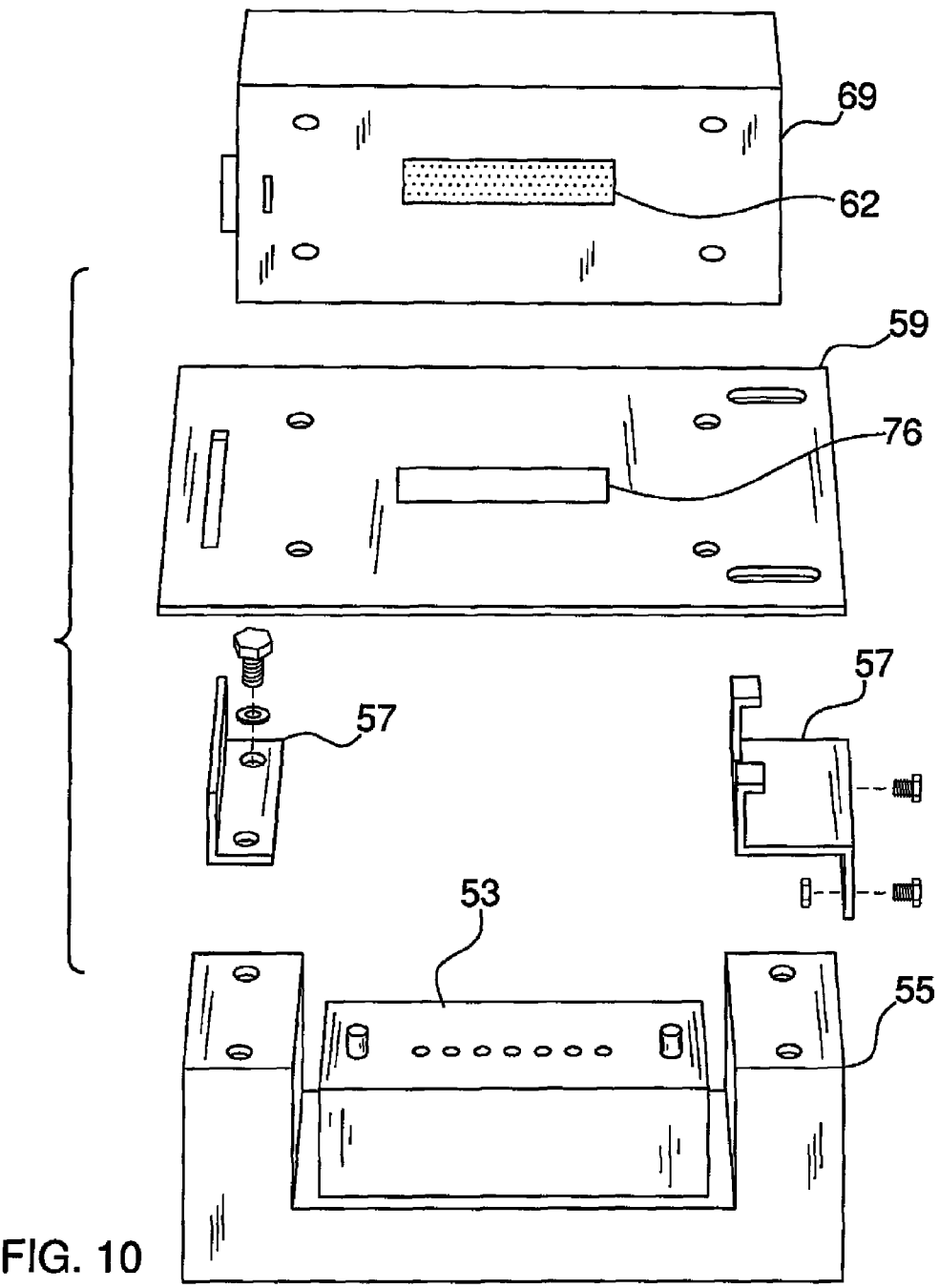
FIG. 10 is an exploded view of an embodiment of the disclosure.
Figure 11:
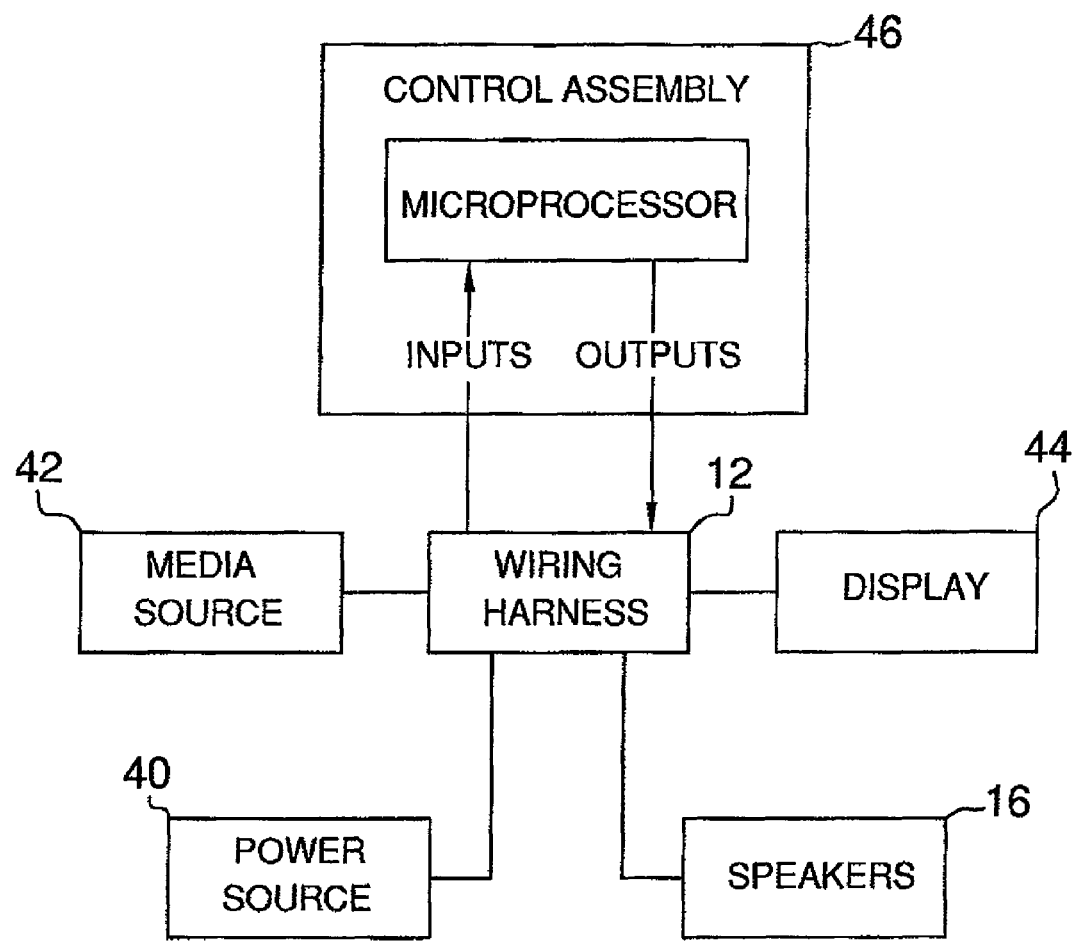
FIG. 11 is a system block diagram of an embodiment of the disclosure.

With reference now to the drawings, and in particular to FIGS. 1 through 11 thereof, a new media system embodying the principles and concepts of an embodiment of the disclosure and generally designated by the reference numeral 10 will be described.

As best illustrated in FIGS. 1 through 11, the motorcycle media system 10 generally comprises a wiring harness 12 mounted on a motorcycle 14 configured to electrically connect at least a display 44, a media source 42, a power source 40, and a plurality of speakers 16. The wiring harness 12 can include a plurality of electrical cables and a connector 63 at one end for electrically connecting the wiring harness 12 to a control assembly 46.

A plurality of speakers 16 is mounted to the motorcycle 14 so that audio emitted by the speakers 16 is directed at the rider of the motorcycle 14. The speakers 16 are in electrical communication with the wiring harness 12. At least one of the speakers 16 may be mounted to a rear view mirror 18, a crash bar, a saddle bag, or a handlebar 20. The speakers 16 can include a left front speaker, a center front speaker, and right front speaker, a right rear speaker and a left rear speaker, as well as a subwoofer configured to emit low-frequency audio.

An enclosed housing 22 is mounted behind a rider of the motorcycle 14. The housing 22 is removable to expose a compartment 24. The housing 22 has a top wall 26, a front wall 28, a bottom wall 30 extending between the top and front walls, and two lateral sidewalls 32. The housing 22 has an outside surface 34 and an inside surface 36. The top wall 26 may have at least one of the speakers 16 mounted in it, such as the subwoofer. The bottom wall 30 is engageable with a rear portion 38 of the motorcycle 14, covering the compartment 24. The front wall 28 faces towards a rider, in a forward direction of travel of the motorcycle 14. The housing 22 may have a substantially domed shape, such that the front wall 28 of the housing 22 can rest on a ground surface when the housing 22 is removed from the motorcycle 14, to remotely locate the subwoofer.

A power source 40 is mounted to the motorcycle 14 and is in electrical communication with the wiring harness 12. The power source 40 may be a battery of the motorcycle 14, a battery integrally located within the media source 42 or may be an alternating current power source 40, such as power from a 120 volt electric receptacle. The power source 40 may be rechargeable using power from a 120 volt electric receptacle.

A media source 42 is mounted to the motorcycle 14 within the compartment 24, in electrical communication with the wiring harness 12. The media source 42 may be mounted underneath the front seat. The media source 42 is capable of receiving media containing encoded audio or video content, decoding the content, and electrically communicating the content through the wiring harness 12. The media source 42 may include a digital video disc player, a compact disc player, a digital audio player, a television tuner, a radio tuner, a satellite radio tuner, or a satellite television tuner.

A display 44 is mounted within the compartment 24 and is in electrical communication with the wiring harness 12. The display 44 includes a pivoting mount to allow the display 44 to be pivoted between a stored position and an upright position.

A control assembly 46 is in electrical communication with the wiring harness 12 to control the operation of the system 10. The control assembly 46 includes a power control, volume control, source control, and an output control. The control assembly 46 is capable of being connected or disconnected from the wiring harness 12. The controller 64 may include a microprocessor in electrical communication with a plurality of inputs and outputs, configured to electrically receive content from the media source 42 and selectively output the content to the speakers 16 or the display 44. The control assembly 46 includes a control plate 48 with a front side 50, a back side 52, a top 54, a bottom 56 and opposing sides 58. Tabs 60 attached to opposing sides 58 of the control plate 48 can secure the control assembly 46 to a bracket 61. A jack 62 is attached to the back side 52 of the control plate 48 for receiving a connector 63 of the wiring harness 12.

A bracket 61 supports the control assembly 46 on handlebars of the motorcycle 14, including a first bracket plate 65 and a second bracket plate 69. The first bracket plate 65 attaches to the handlebars so that the first bracket plate 65 is elevated from the handlebars. The first bracket plate 65 is rectangular and includes a first plurality of apertures 66 configured to match apertures 67 in the handlebars. The first apertures 66 can receive first fasteners 68 to fasten the first bracket plate 65 to the handlebars. The first apertures 66 on the first bracket plate 65 can be configured to mate with apertures 67 of varying configurations in order that the first bracket plate 65 can be used on a variety of motorcycles.

The second bracket plate 69 is mounted to the first bracket plate 65. The second bracket plate 69 is rectangular and has an upper surface 70 and a lower surface 71, a top edge 72, a bottom edge 73, and two lateral side edges 74. Apertures 67 extending through the upper surface 70 and the lower surface 71 are located in the second bracket plate 69 adjacent to the side edges 74. The apertures 67 receive the tabs 60 of the control assembly 46. A rectangular aperture 76 between the upper and lower surfaces is located in the second bracket 61 for receiving the connector 63 of the wiring harness 12. The second bracket plate 69 has a second plurality of apertures 77 for receiving second fasteners 78 to fasten the second bracket plate 69 to a third plurality of apertures 79 in the first bracket plate 65.

An auxiliary battery 53 may be received by a battery rack 55 that can be positioned between the seat and an existing battery of the motorcycle. The battery rack 55 is elongated, with a base member and two rack side members attached to and at substantially right angles to the base member. The auxiliary battery 53 is received by the battery rack 55 between the rack side members. Each rack side member has a surface opposite the base member with threaded indentations for receiving threaded fasteners. Mounting brackets 57 can be placed on the rack side members and secured with the threaded fasteners. The mounting bracket 57 is configured to mate with a locking plate 59 that in turn receives the second bracket plate 69. The control plate 48 can then be mounted on the second bracket plate 69, and electrically connected to the connector 63. The auxiliary battery 53 may be used independently of the motorcycle's battery to power the media system 10, and may be recharged using a 120 volt power source.

In use, the housing 22 may be removed from the motorcycle 14 and placed on a ground surface, so that the subwoofer is pointed at the rider of the motorcycle 14. The display 44 may be pivoted from a stored position to an upright position. A video source may be selected using the control assembly 46 so that video appears on the display 44 and any associated audio is played through the speakers 16. The housing 22 may also be left in place on the motorcycle 14 if the rider chooses to listen to music through the system 10. An audio source may be selected using the control assembly 46 so that audio is played through the speakers 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:
1. A motorcycle media system comprising:
a wiring harness mounted on a motorcycle;
a plurality of speakers being mounted to said motorcycle, said speakers being in electrical communication with said wiring harness, said speakers being positioned so that audio emitted by said speakers is directed at a rider of said motorcycle, at least one of said speakers being mounted to a crash bar of said motorcycle, at least one of said speakers being mounted to a saddle bag of said motorcycle, at least one of said speakers being mounted to a handlebar of said motorcycle, said speakers defining a left front speaker, a center front speaker, and right front speaker, a right rear speaker and a left rear speaker, said speakers comprising a subwoofer configured to emit low-frequency audio;
an enclosed housing being mounted behind and underneath said rider of said motorcycle, said housing being removable from said motorcycle to expose a compartment in said motorcycle, said housing having a top wall, a front wall, a bottom wall, and two lateral sidewalls, said housing having an outside surface and an inside surface, said top wall having at least one of said speakers mounted therein, said bottom wall being engageable with a rear portion of said motorcycle, said bottom wall covering said compartment when said housing is mounted on said motorcycle, said front wall facing in a forward direction of travel of said motorcycle, said housing having a substantially domed shape, said front wall of said housing supporting said housing on a ground surface when said housing is removed from said motorcycle and placed on said ground surface;
a power source being mounted to said motorcycle and in electrical communication with said wiring harness, said power source comprising a battery of said motorcycle;
a media source being mounted to said motorcycle and in electrical communication with said wiring harness, said media source being mounted within said compartment, said media source capable of receiving media containing encoded audio or video content, decoding said content, and electrically communicating said content through said wiring harness, said media source being selected from a list including at least one of a digital video disc player, a compact disc player, a digital audio player, a television tuner, a radio tuner, a satellite radio tuner, or a satellite television tuner;
a display mounted within said compartment and being in electrical communication with said wiring harness, said display including a pivoting mount to allow said display to be pivoted between a stored position and an upright position;
a control assembly in electrical communication with said wiring harness for controlling said operation of said system, said control assembly having a power control, volume control, a source control, and an output control, said control assembly being capable of being connected and disconnected from said wiring harness, said control- ler comprising a microprocessor in electrical communication with a plurality of inputs and outputs, said control assembly including;
- a control plate having a front side, a back side, a top, a bottom and opposing sides, tabs being attached to said opposing sides for securing said control assembly to a bracket;
- a jack being attached to said back side for receiving a connector of said wiring harness; and
- a controller configured to electrically receive content from said media source and selectively output said content to said speakers or said display; and said bracket supporting said control assembly on handlebars of said motorcycle, said bracket comprising:
- a first bracket plate attached to said handlebars so that said first bracket plate is elevated from said handlebars, said first bracket plate being rectangular, said first bracket plate having a first plurality of apertures therein, said first apertures configured to match apertures in said handlebars, said first apertures for receiving first fasteners to fasten said first bracket plate to said handlebars; and
- a second bracket plate mounted to said first bracket plate, said second bracket plate being rectangular and having an upper surface and a lower surface, said second bracket plate having a top edge, a bottom edge, and two lateral side edges, said second bracket plate having tab apertures therein adjacent to said side edges and extending through said upper surface and said lower surface for receiving said tabs of said control assembly, said second bracket plate having a rectangular aperture therein between said upper and lower surfaces configured to receive said connector of said wiring harness, said second bracket plate having a second plurality of apertures therein for receiving second fasteners to fasten said second bracket plate to a third plurality of apertures in said first bracket plate.

* * * * *